United States Patent
Rabe et al.

(10) Patent No.: US 10,288,512 B2
(45) Date of Patent: May 14, 2019

(54) FLUID PROCESSING APPARATUS

(71) Applicant: Hydac Electronic GmbH, Saarbrücken (DE)

(72) Inventors: Jens Rabe, Bexbach (DE); Joachim Morsch, Marpingen (DE); Steffen Bonnert, St. Ingbert (DE)

(73) Assignee: HYDAC ELECTRONIC GMBH, Saarbruecken (DE)

( * ) Notice: Subject to any disclaimer, the term of this patent is extended or adjusted under 35 U.S.C. 154(b) by 73 days.

(21) Appl. No.: 14/672,659

(22) Filed: Mar. 30, 2015

(65) Prior Publication Data
US 2015/0300902 A1    Oct. 22, 2015

(30) Foreign Application Priority Data

Apr. 16, 2014    (DE) .......................... 10 2014 005 637

(51) Int. Cl.
| G01L 19/00 | (2006.01) |
| G01D 11/24 | (2006.01) |
| F15B 15/28 | (2006.01) |

(52) U.S. Cl.
CPC ...... *G01L 19/0092* (2013.01); *F15B 15/2892* (2013.01); *G01D 11/245* (2013.01); *F15B 15/2861* (2013.01)

(58) Field of Classification Search
CPC ............... G01L 19/0092; G01D 11/245; F15B 15/00–15/2892
See application file for complete search history.

(56) References Cited

U.S. PATENT DOCUMENTS

| 5,301,543 A * | 4/1994 | Reichert | G01N 33/2847 436/40 |
| 5,563,337 A * | 10/1996 | Fitch | G01N 29/14 73/61.43 |
| 5,659,132 A * | 8/1997 | Novak | F16J 15/064 73/114.16 |
| 6,394,647 B1 * | 5/2002 | Allmendinger | F02D 35/023 374/142 |
| 6,549,873 B1 * | 4/2003 | Nagai | F15B 21/045 367/97 |

(Continued)

FOREIGN PATENT DOCUMENTS

| DE | 10 2011 100 532 A1 | 11/2012 |
| DE | 10 2011 120 228 A1 | 6/2013 |
| WO | WO 2012171049 A1 * | 12/2012 ............... F02N 7/08 |

*Primary Examiner* — Peter J Macchiarolo
*Assistant Examiner* — Nathaniel J Kolb
(74) *Attorney, Agent, or Firm* — Wenderoth, Lind & Ponack, L.L.P.

(57) ABSTRACT

A fluid processing apparatus having a housing (2), which at least substantially seals a fluid chamber fluid chamber (18, 20) from the external environment. At least one sensor device (26, 40, 60) provides information regarding the state of the fluid located in the fluid chamber (18, 20), such as pressure, moisture level, temperature or viscosity and/or provides information regarding the motion of a separating element (16) that can be moved within the fluid chamber (18, 29). At least one component (40, 60) of the sensor device can be included as an interchangeable, modular component in a part (6) of the housing (2) such that the component (40, 60) has an inlet (42) to the fluid located in the fluid chamber (18, 20).

22 Claims, 7 Drawing Sheets

(56) References Cited

U.S. PATENT DOCUMENTS

| | | | |
|---|---|---|---|
| 7,023,199 B2 | 4/2006 | Blubaugh et al. | |
| 2007/0013036 A1* | 1/2007 | Zhe | B81C 1/0023 257/659 |
| 2008/0072657 A1* | 3/2008 | Herbert | F15B 13/0814 73/37 |
| 2009/0090189 A1* | 4/2009 | Villaire | G01L 23/222 73/723 |
| 2011/0005387 A1* | 1/2011 | Ehre | F16F 9/0218 92/5 R |
| 2011/0166802 A1* | 7/2011 | Kong | G01N 11/10 702/50 |
| 2014/0102409 A1* | 4/2014 | Rangger | F02N 7/08 123/319 |

* cited by examiner

FLUID PROCESSING APPARATUS

FIELD OF THE INVENTION

The invention relates to a fluid processing apparatus having a housing, which at least substantially seals a fluid chamber off from the external environment. At least one sensor device provides information regarding the state of the fluid located in the fluid chamber such as pressure, moisture level, temperature or viscosity and/or provides information regarding the state of motion of a separating element that can be moved within the fluid chamber.

BACKGROUND OF THE INVENTION

Fluid processing apparatuses of this generic type are known in the prior art and are used in various designs, for example, as actuators such as hydraulic working cylinders, as hydraulic accumulators, for example, in the form of piston accumulators, and as a spring-damper element for hydraulic suspension systems or the like. In the case of fluid systems for steering and control processes, measured variables that indicate the state of the fluid are the most important parameters. The determination of measured variables, which is performed in a decentralized manner in the prior art, is disadvantageous for a number of reasons. Thus, for example, a pressure measurement taken via pressure lines is imprecise and prone to errors. In particular in the event that a plurality of state variables must be determined, a great deal of mechanical effort and cabling work is associated therewith.

SUMMARY OF THE INVENTION

An object of the invention is to provide an improved fluid processing apparatus, which allows for an especially advantageous determination of state variables for the fluids.

This object is basically achieved according to the invention by a fluid processing apparatus having, as an essential characteristic of the invention, at least one component of the sensor device included as an interchangeable, modular component in a part of the housing such that the component has an inlet to the fluid located in the fluid chamber. Due to the sensor according to the invention being modularly integrated into the housing and the determination of the measured variables being carried out directly in the respective fluid chamber, the expenditure needed for external devices is eliminated. No additional installation space and no separate cabling is then needed. In addition, the integrated sensors are installed such that they are protected from external damage.

A particular advantage of the invention is that a pressure measurement taken directly in the fluid chamber is more precise than a measurement taken at more distant point in the system. In many cases, a very precise pressure measurement is needed for precise control processes, for example in the case of on-board weighing systems or in the case of applications in the field of load moment limitation.

In an especially advantageous manner, the inlet for the respective component of the sensor device can be formed by a recess that is open at least to the fluid chamber and that is formed in a wall element of the housing that delimits the fluid chamber, on which or in which recess the respective component is mounted.

To determine the fluid pressure, a pressure measurement cell allocated to the recess may be provided as a component of the sensor device, which pressure measurement cell may be exposed to fluid via the end of the recess that is open to the fluid chamber.

In an especially advantageous manner, the appropriate pressure measurement cell may be provided on an insert, which can be inserted into the recess from the end that is open to the external environment, preferably being screwed in. The insert forms the support for an ASIC printed circuit board, which processes signals from the pressure measurement cell. In an advantageous manner, sensors and electronics thus form a single assembly. These sensors and electronics can be adjusted in terms of parameters such as pressure and temperature before screwing the insert into the recess to store these parameters in the ASIC printed circuit board. Thus, adjustment measures by expensive test adapters are no longer needed when the assembly is installed.

In the case of a modified example, the pressure measurement cell may be provided on an insert, which can be inserted into the recess from the end that is open to the fluid chamber, preferably being screwed in. At the same time, the pressure measurement cell can be bonded or soldered to the end of the insert that is facing the external environment.

Alternatively, the component comprising a pressure measurement cell may have a capillary tube screwed into the associated, continuously formed recess. At the outer end of that recess facing away from the fluid chamber, the pressure measurement cell is mounted, for example, by welding.

In addition, in an advantageous manner, a component of the sensor device may be provided as a sensor for determining the state of the fluid, for example, to determine the relative moisture level and/or the temperature of the fluid.

In the case of such embodiments, the sensor for determining the state of the fluid may have a capacitive moisture sensor having capacitor structures that project from the respective recess into the fluid chamber. In the case of such embodiments, an insert that can be installed in the appropriate recess may also be provided as a support for capacitor elements. On the other hand, the insert may also form the support for allocated electronics, for example an ASIC printed circuit board.

In the case of especially advantageous embodiments, the housing may be provided in the form of a fluid cylinder, in which a piston, as a movable separating element, divides the fluid chamber into working chambers. The cylinder end piece, which seals the cylinder at an axial end thereof, forms the wall element that accommodates the respective component or components of the sensor device. In the case of fluid cylinders, which serve as actuators such as working cylinders, piston accumulators or spring elements, especially advantageously a sensor is integrated into a cylinder head piece or end piece.

In an especially advantageous manner in the case of such embodiments, the piston, which is connected to a piston rod, may separate a working chamber on the side having the piston rod from the working chamber on the side having the piston. A component that forms a displacement measurement system of the sensor device extends coaxially from the cylinder end piece that seals the working chamber on the piston side into the interior of the cylinder. At least one recess for an additional component of the sensor device is formed in this cylinder end piece. Suspension cylinders having integrated sensors, such as pressure measurement sensors in combination with a travel sensor for piston movements, can be utilized in an especially advantageous manner in applications, in which a high degree of measurement accuracy is needed despite limited available installation space.

In an especially advantageous manner in the case of such embodiments, the displacement measurement system may have a rod-like body, which extends coaxially from the cylinder end piece into the interior. The recess for the respective additional component of the sensor device is located in the cylinder end piece such that it is offset from the axis. As a result, the measurement signal of the displacement measurement system is also available on the same cylinder end as the signal of the additional component or additional components of the sensor.

In the case of such embodiments, a displacement measurement system may advantageously be provided, which operates in a contactless manner, and which corresponds to the prior art, and which functions in accordance with a magnetostrictive method.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure.

DETAILED DESCRIPTION OF THE INVENTION

Figure 1:
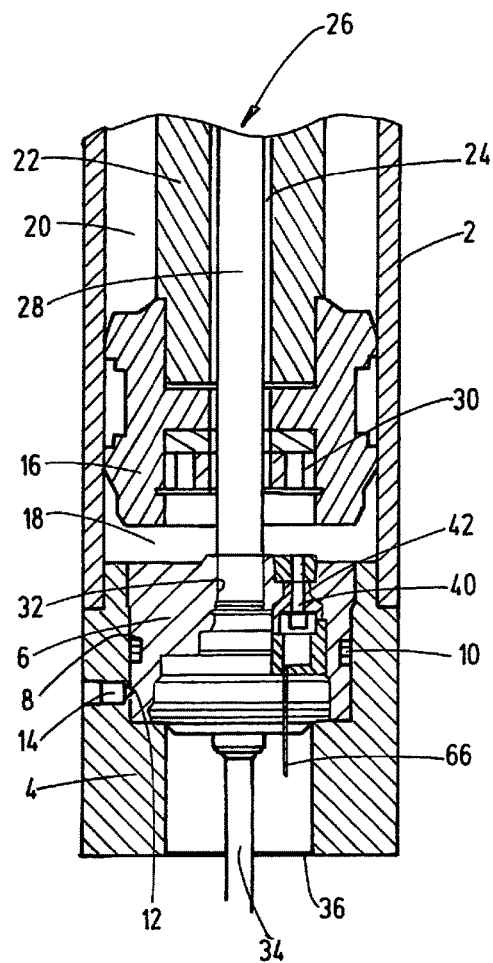
FIG. 1 is a schematically simplified, partial side view in section of a fluid cylinder according to a first exemplary embodiment of the fluid processing apparatus according to the invention, with the portion illustrated being adjacent to the head piece at the end.
Figure 2:
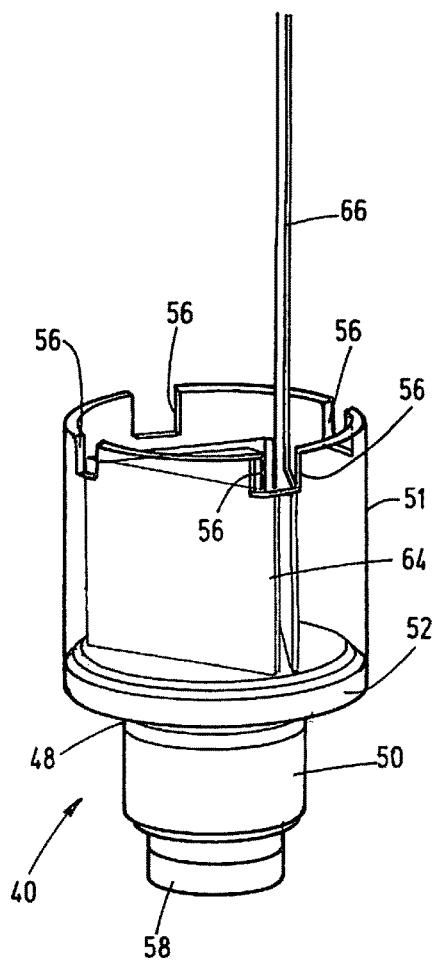
FIG. 2 is a perspective view, in a scale that is enlarged by approximately three times as compared to a practical embodiment, of a sensor device according to a second exemplary embodiment of the invention.
Figure 3:
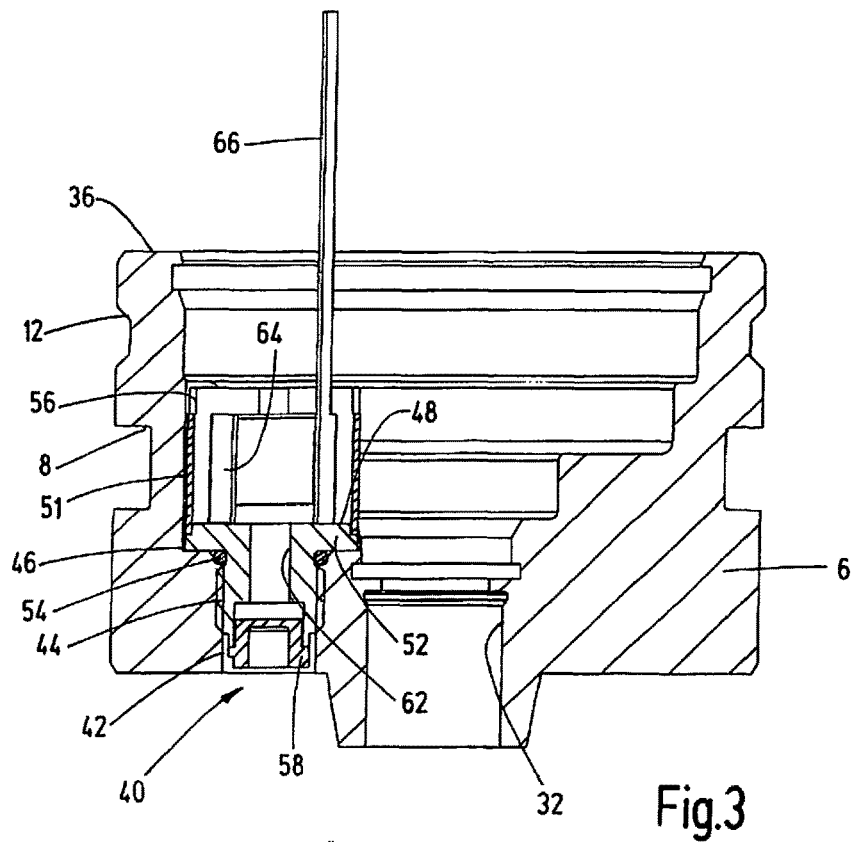
FIGS. 3 and 4 are a side view and perspective view, respectively, each in section of the cylinder end piece of the fluid cylinder from FIG. 1, having been provided with the component of the sensor device shown in FIG. 2.
Figure 4:
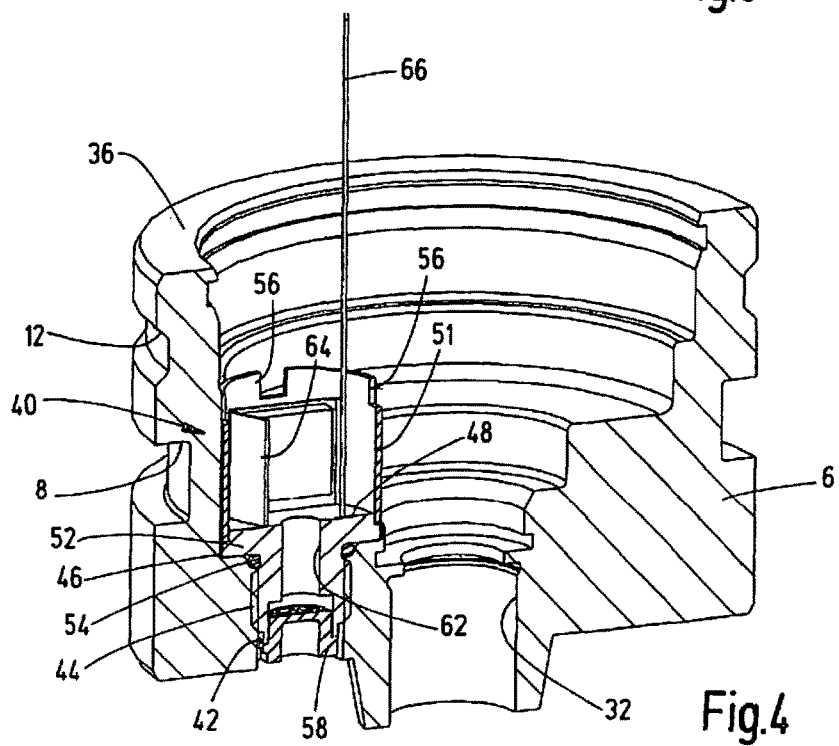

The invention is described below with reference to the drawings on the basis of embodiments, in which the processing apparatus has a housing in the form of a fluid cylinder 2. Of these Figures, only FIG. 1 depicts a longitudinal section of cylinder 2, which is adjacent to a head piece 4 located at an end of the cylinder. This head piece 4, together with a cylinder end piece 6 that is concentrically disposed in the head piece 4, forms the fluid-tight seal of the fluid chamber located inside the cylinder 2. In order to seal it against the head piece 4, the end piece 6 has a circumferential annular groove 8 as a sealing element or seal 10. An additional annular groove 12 is provided in order to engage with a fastening grub screw 14.

In the case of the examples shown here, a piston 16, which can be moved longitudinally, is located in the fluid cylinder 2, which forms the housing. The piston 16 separates the inner fluid chamber of the cylinder 2 into a working chamber 18 on the side having the piston, and a working chamber 20 on the side having a piston rod 22. Piston rod 22 is connected to the piston 16, extends in this cylinder in the direction of the cylinder end, is not visible in FIG. 1, and extends out of the cylinder in a sealed manner, as is conventional for such cylinders. In the example shown, the piston rod 22 is designed as a hollow tube, in which a coaxial, inner cavity 24 is located. Inner cavity 24 forms the receiving space for a displacement measurement system 26. In the present example, this measurement system is a magnetostrictive linear displacement sensor of the HLT1100 series, as is sold by Hydac Electronic GmbH, Hauptstr. 27, D 66 328 Saarbruecken, Germany. This displacement sensor has a rod-like hollow body 28 in the form of a protective tube that is closed at the free end thereof, in which a magnetostrictive waveguide is clamped. The hollow body 28 extends from the cylinder end piece 6, through the inner cavity 24 of the piston rod 22, over a distance that corresponds to the travel range of the piston 16 in the cylinder 2. The piston 16 has a magnetic ring 30 as a position detector for the magnetostrictive method, which magnetic ring generates a permanent magnetic field.

The hollow body 28 of the displacement measurement system 26, which forms a component of the sensor device, is positioned at the lower end thereof in FIG. 1 in a central bore 32 that forms a recess at the end of the cylinder end piece 6 adjacent to the side of the working chamber 18 having the piston. The connection cable 34 associated with the electronics of the measurement system 26 extends outward, out of the open end 36 of the sleeve-shaped head piece 4.

Figure 10:
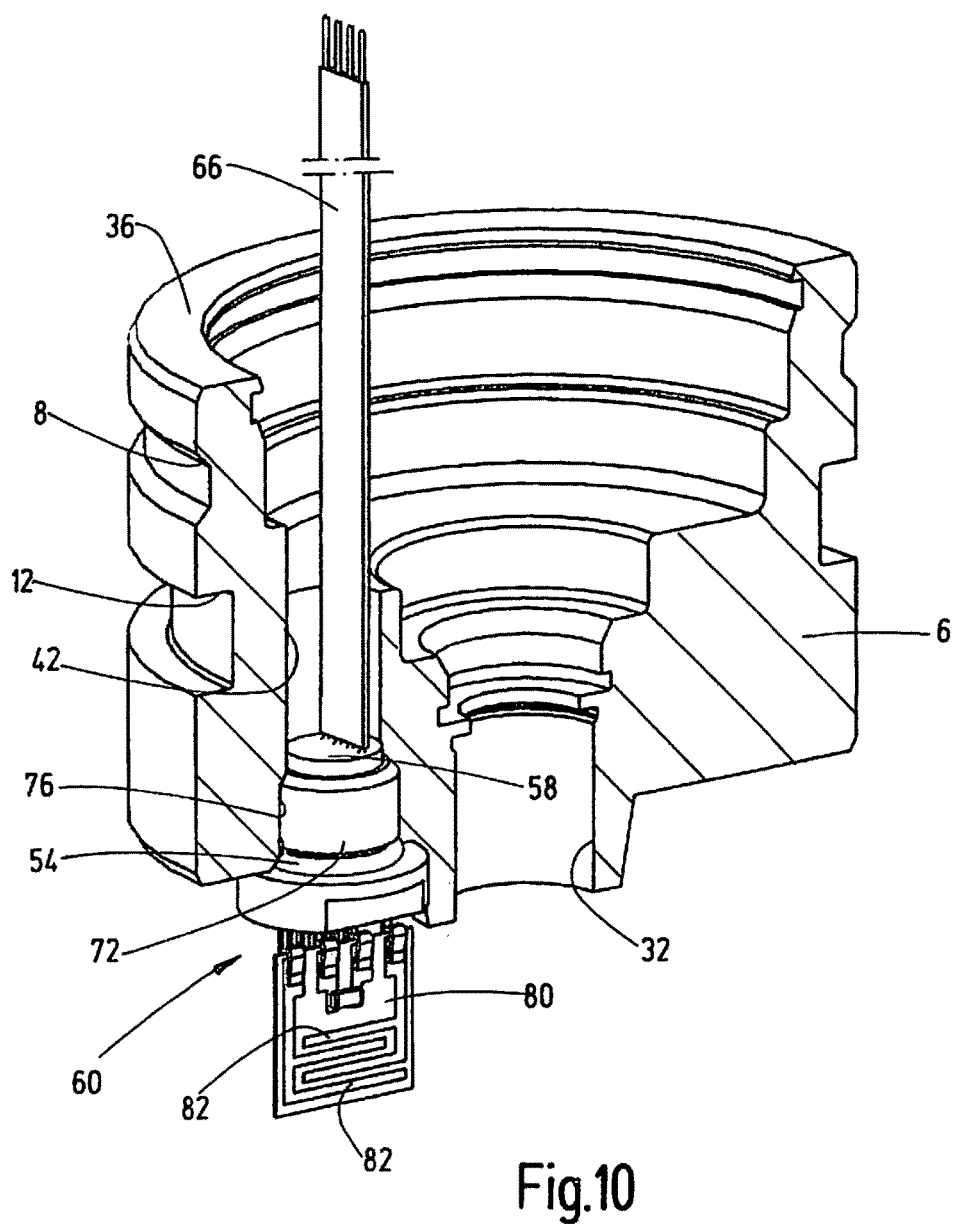
FIG. 10 is a perspective view in section of a cylinder end piece provided with a component of a sensor device according to a sixth exemplary embodiment of the invention.
Figure 11:
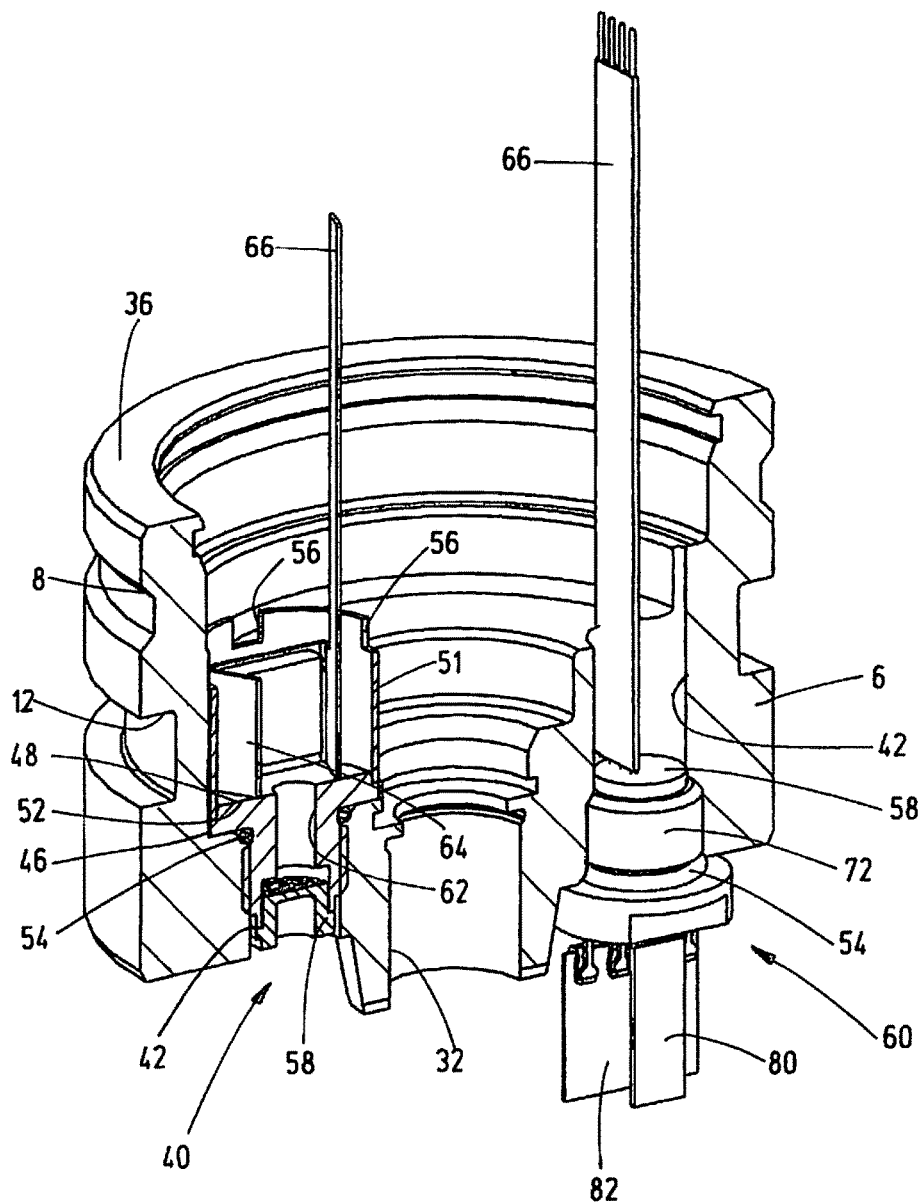
FIG. 11 is a perspective view in section of a cylinder end piece provided with two components of the sensor device according to seventh exemplary embodiment of the invention.

FIGS. 1 to 9 and 11 show pressure measurement devices 40 in various configurations as an additional component of the sensor device. FIGS. 10 and 11 show a moisture sensor device 60 as an additional component for an oil state sensor. In FIG. 11, a moisture sensor device 60 is shown in addition to a pressure measurement device 40. A recess 42 that forms an inlet to the adjacent fluid chamber, in the present examples, a working chamber 16 on the side having the piston, is formed in the end piece 6 for all embodiments of the pressure measurement device 40 as well as for the moisture sensor device 60. Recess 42 is disposed offset from the central region of the end piece 6, in which the receptacle 32 for the displacement measurement system 26 is located. In the examples that are shown, the recess 42 between the side facing the working chamber 18 and side turned towards the external environment is formed such that it is continuous. In the case of the example in FIGS. 3 and 4, the recess 42 is formed by a stepped bore having a tapered threaded section 44 on the side facing the working chamber 18 and a thread-free bore section 46 with a larger diameter on the side remote from the external environment. The pressure measurement device 40 from the example in FIGS. 2 to 4 has an insert 48, which is depicted separately in FIG. 2 and which has an outer thread 50, which can be screwed into the threaded section 44 of the recess 42. When in a screwed in state, an extended flange part 52 that is adjacent to the outer thread 50 is received in the expanded bore section 46 of the recess 42. A sealing ring 54 forms the seal at the transition between the flange part 52 and the threaded section 44. A tube 51 is welded to the circumferential edge of the flange part 52. The tube has wall openings 56 along the open edge to provide access for a screwing tool for installing the insert 48. A pressure measurement cell 58 is directly exposed to fluid pressure in the working chamber 18 and the environment on its opposite sides and is located on the end opposite the flange part 52, at which end the insert 48 is in contact with the working chamber 18. The pressure measurement cell 58 is seated in a section of a coaxial bore 62, which ends at the flange part 52. The free end of the flange part 52 forms the support for electronics that are associated with the pressure measurement cell 58. The electronics are formed by an ASIC printed circuit board 64, which is located in a folded state within the tube 51, and from which a connection cable 66 having stranded conductors extends outward into the external environment.

Figure 5:
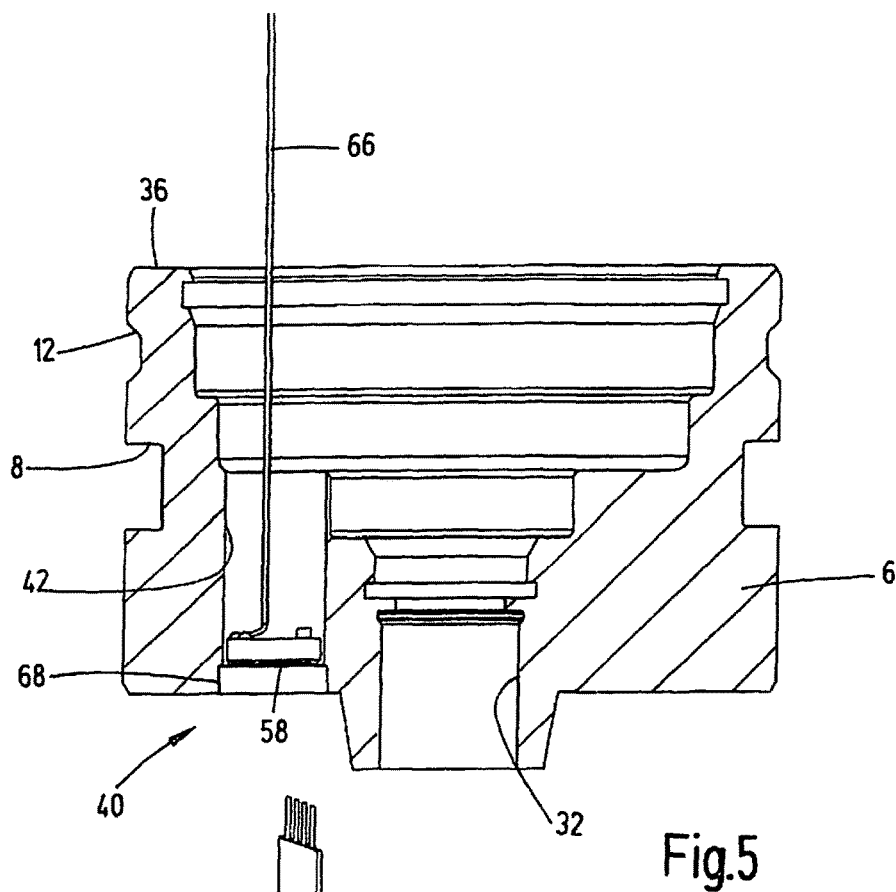
FIGS. 5 and 6 are a side view and a perspective view, respectively, each in section of a cylinder end piece provided with a component of the sensor device pursuant to a third exemplary embodiment of the invention.
Figure 6:
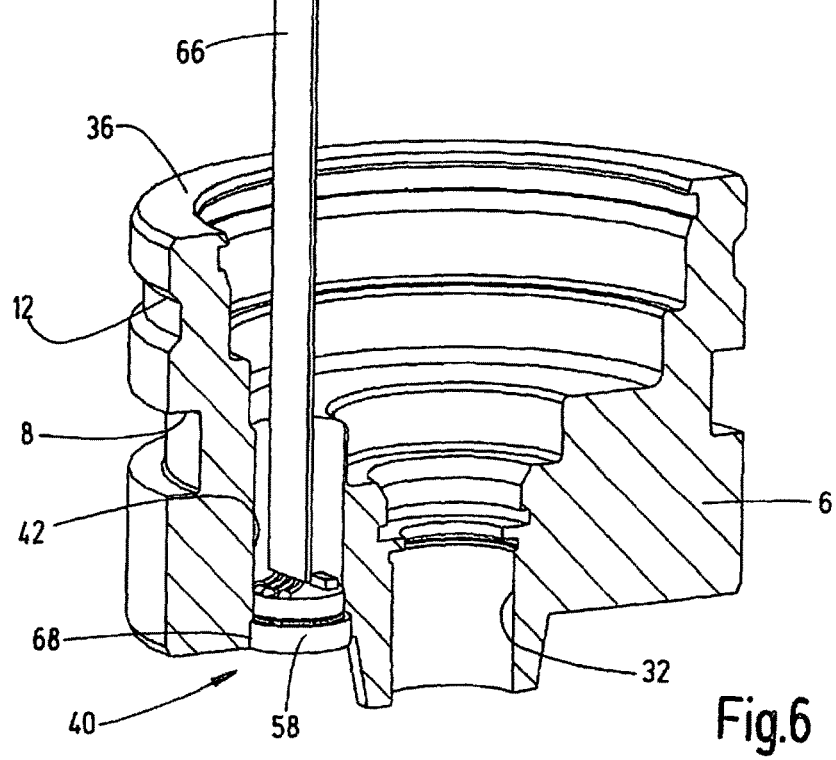

FIGS. 5 and 6 show an embodiment, in which the recess 42 for the component formed by the pressure measurement device 40 is formed as a thread-free bore. The bore 42 has a slight expansion 68 in the vicinity of the end adjacent to the working chamber 18, which end forms the seat for a pressure measurement cell 58 welded into the front. From that front, a connection element 66 having stranded conductors extends through the free section of the recess 42 to the external environment.

Figure 7:
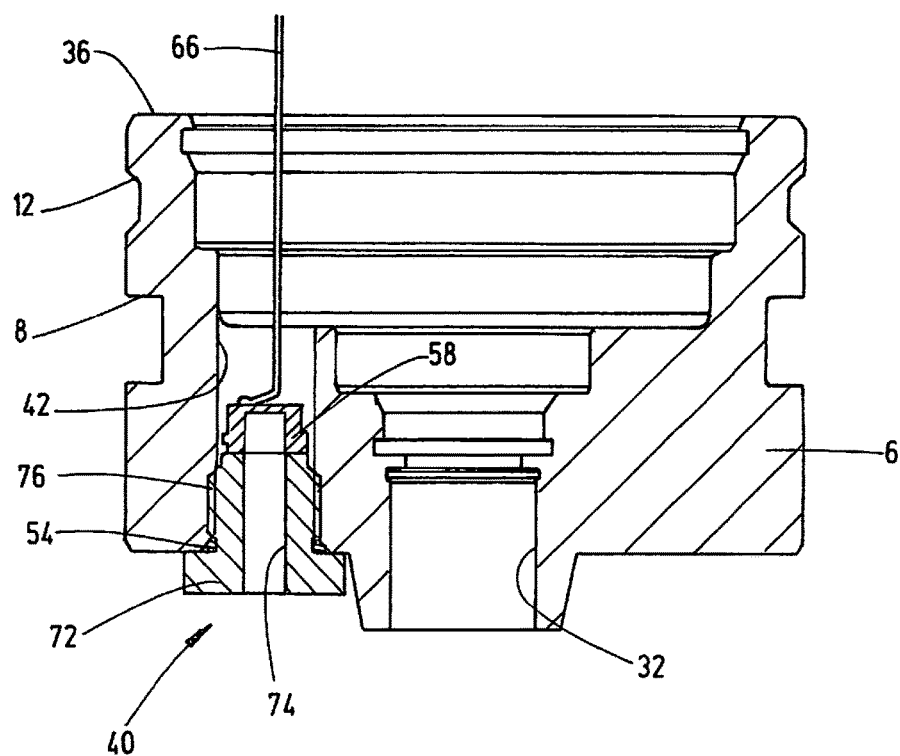
FIG. 7 is a side view in section of a cylinder end piece provided with a component of a sensor device according to a fourth exemplary embodiment of the invention.

FIG. 7 shows an embodiment, in which the component formed by the pressure measurement device 40 has a screw adapter 72 having a coaxial inner passageway 74. The screw adapter 72 is screwed in from the side of the working chamber 18 into a threaded section 76 of the recess 42. As in the case of FIGS. 3 and 4, a sealing ring 54 is provided at the end of the recess 42. The pressure measurement cell 58 is welded onto the end of the screw adapter 72 that faces the external environment, which pressure measurement cell is exposed to fluid pressure via the passageway 74 of the screw adapter 72.

Figure 8:
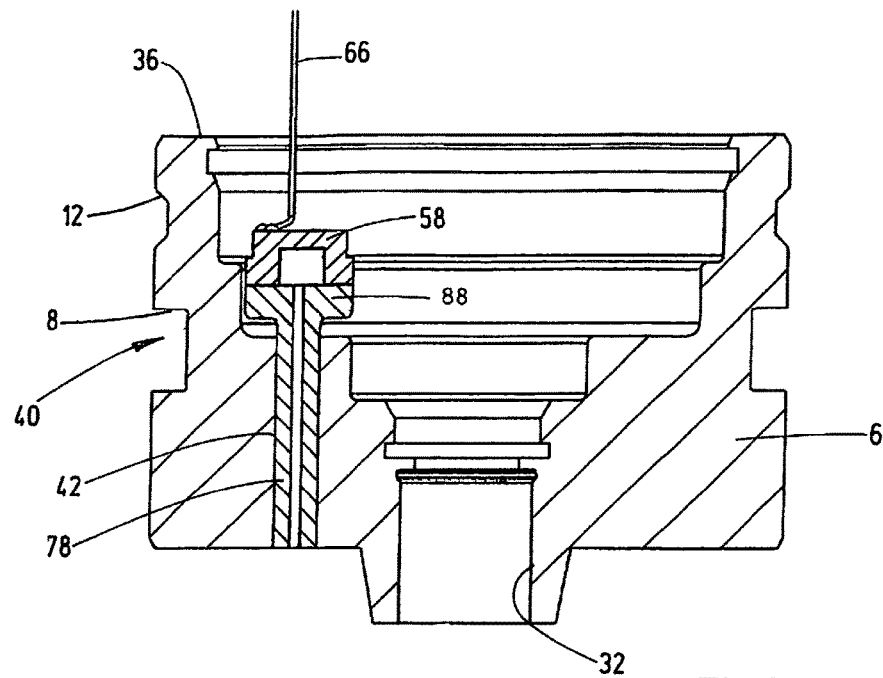
FIGS. 8 and 9 are a side view and a perspective view, respectively, each in section of a cylinder end piece provided with a component of a sensor device according to a fifth exemplary embodiment of the invention.
Figure 9:
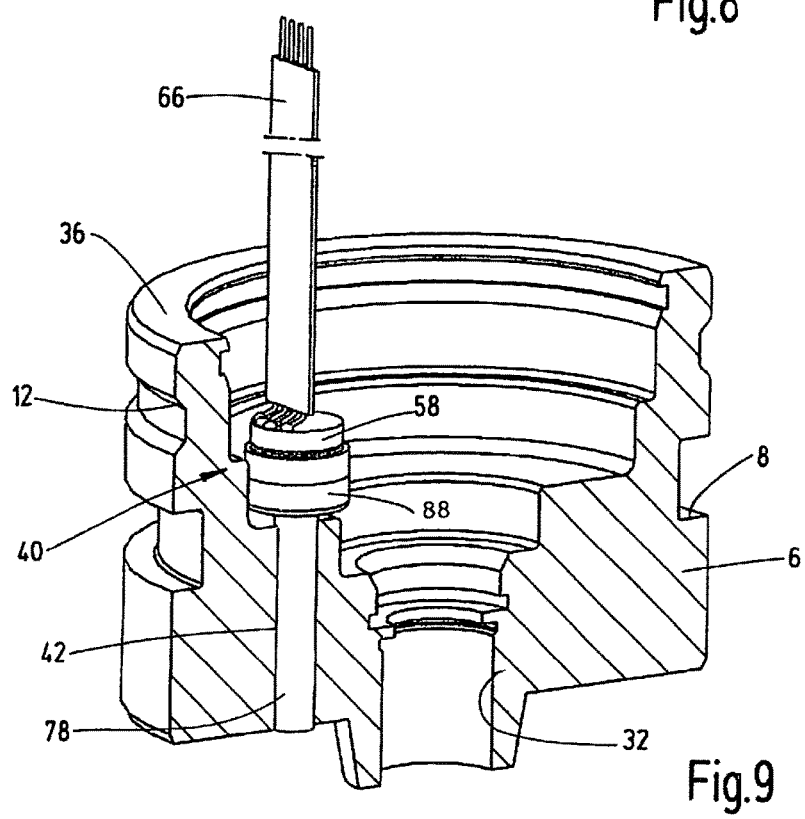

FIGS. 8 and 9 show an embodiment, in which the recess 42, for the component formed by a pressure measurement device 40, is formed by a bore. The bore is formed such that it is continuous, having the same diameter in the cylinder end piece 6. A capillary tube 78 is welded or screwed into this bore. The capillary tube has a head piece 88 that faces the external environment, to which the pressure measurement cell 58 is welded. This cell is exposed to fluid pressure via the inner tube or passage of the capillary tube 78.

In the case of the embodiment in FIG. 10, a sensor device 60 is provided with a moisture sensor 80 and a glass or ceramic chip having capacitor structures 82. Similar to the embodiment in FIG. 7, the sensor device 60 has a screw adapter 72, which is screwed in from the side of the working chamber 18 into a threaded section 76 of the recess 42. Recess 42 is again sealed by a sealing ring 54. A glass passageway is located at the end facing the working chamber 18, from which passageway the moisture sensor 80 and the glass or ceramic chip with capacitor structures 82 extends into the interior of the working chamber 18. Like the signals from the pressure measurement cell 58, the signals from the chips 80 and 82 reach the outside via the connection cable 66. The sensor device 60 permits monitoring the state of the fluid, for example hydraulic fluid. Determination can thereby be determined whether there is too much released water or even free water in the hydraulic oil, which water could result in damages, for example as a result of cavitation.

FIG. 11 shows an embodiment, in which, in addition to a displacement measurement system 26, the sensor device has both a pressure measurement device 40 and a moisture sensor device 60 that are circumferentially spaced on the cylinder end piece 6. In this case, the design of the pressure measurement device 40 and the moisture sensor device 60 correspond to each of the embodiments in FIGS. 3 and 4 or, respectively, FIG. 10. While a pressure measurement cell 58 is provided in each of these examples as the pressure measurement device 40, in the example in FIG. 11 two separate pressure measurement cells can be provided. A redundant system can be created in the case that there are two pressure sensors with mutual verification in the evaluation electronics (ASIC printed circuit board 64). In addition, temperature sensors may be provided as additional components, for example in the form of the pressure measurement cells 58 and/or temperature-variable resistors allocated to the capacitor structures 82.

While various embodiments have been chosen to illustrate the invention, it will be understood by those skilled in the art that various changes and modifications can be made therein without departing from the scope of the invention as defined in the claims.

The invention claimed is:

1. A piston sensor system for a fluid processing apparatus, comprising:
    a housing having a fluid chamber therein at least substantially sealed from a surrounding external environment and having a fluid cylinder with a cylinder end piece at one axial end of said cylinder and with a longitudinal axis delimiting said fluid chamber, said cylinder end piece having a first recess in said cylinder end piece, said first recess having a first end open to said fluid chamber and being laterally offset from said longitudinal axis;
    a separating element movably mounted in said fluid cylinder of said housing, said separating element including a piston dividing said fluid chamber into first and second working chambers;
    an interchangeable, modular pressure sensor providing information regarding pressure of fluid in said fluid chamber, said pressure sensor including a pressure measurement cell being mounted only in said first recess and not in said fluid chamber and being exposed to fluid in said fluid chamber via said first end of said first recess open to said fluid chamber;
    a piston rod connected to said piston with said piston rod extending in said first working chamber and with a free end of said piston facing said second working chamber; and
    a piston displacement sensor extending coaxially from said cylinder end piece into said second working chamber and being mounted in a second recess in said cylinder end piece, said piston displacement sensor including a rod-shaped body projecting coaxially from said cylinder end piece into said second working chamber along said longitudinal axis and being a magnetostrictive linear displacement sensor.

2. The piston sensor system according to claim 1 wherein said first recess has a second end opposite said first end and open to the external environment, said insert being insertable into said first recess from said second end.

3. The piston sensor system according to claim 1 wherein an insert is provided on said pressure measurement cell, said insert being supported only in said first recess and having an ASIC printed circuit board processing signals from said pressure measurement cell supported on said insert.

4. The piston sensor system according to claim 3 wherein said insert is threaded in said first recess.

5. The piston sensor system according to claim 3 wherein said insert is insertable into said first recess from said first end.

6. The piston sensor system according to claim 3 wherein said ASIC printed circuit board is folded in said first recess.

7. The piston sensor system according to claim 3 wherein said pressure measurement cell is exposed on opposite sides thereof to fluid in said first recess.

8. The piston sensor system according to claim 1 wherein said pressure sensor comprises a capillary tube having an end open into said fluid chamber.

9. The piston sensor system according to claim 1 wherein at least one of a moisture level sensor or a temperature sensor is provided in said cylinder end piece.

10. The piston sensor system according to claim 1 wherein
a capacitive moisture sensor has capacitors projecting from another recess in said cylinder end piece into said fluid chamber.

11. The piston sensor system according to claim 1 wherein said piston comprise a magnetic ring.

12. A piston sensor system for a fluid process apparatus, comprising:
a cylindrical housing having a longitudinal axis and having a fluid chamber therein;
a separating element movably mounted in said fluid chamber and dividing said fluid chamber into first and second working chambers, said separating element including a piston dividing said first and second working chambers;
a cylinder end piece closing one axial end of said cylindrical housing;
a first recess extending through said cylinder end piece and being laterally offset from said longitudinal axis, said first recess having a first end opening into said fluid chamber and a second end opposite said first end and opening on an external environment surrounding said cylindrical housing; and
an interchangeable, modular pressure sensor being mounted in said first recess on an insert, being located in said first recess and providing signals representative of information on pressure of fluid in said fluid chamber and being exposed to fluid in said fluid chamber; and
a piston displacement sensor extending coaxially along said longitudinal axis from said cylinder end piece into said second working chamber, being mounted in a second recess in said cylinder end piece and being a magnetostrictive linear displacement sensor.

13. The piston sensor system according to claim 12 wherein
said pressure sensor is a pressure measurement cell only located in said first recess and not in said fluid chamber.

14. The piston sensor system according to claim 12 wherein
said insert is threaded in said first recess.

15. The piston sensor system according to claim 14 wherein
said insert is insertable into said first recess from said second end.

16. The piston sensor system according to claim 14 wherein
said insert is insertable into said first recess from said first end.

17. The piston sensor system according to claim 12 wherein
a capillary tube is threaded into said first recess at said second end of said recess and is in fluid communication with said sensor.

18. The piston sensor system according to claim 12 wherein
a capacitive moisture sensor having capacitors projects from a third recess in said cylinder end piece into said fluid chamber.

19. The piston sensor system according to claim 12 wherein
an additional sensor is mounted in a third recess in said cylinder end piece.

20. The piston sensor system according to claim 19 wherein
Said third recess is laterally offset from said longitudinal axis and circumferentially spaced from said first recess.

21. The piston sensor system according to claim 12 wherein
a piston rod is connected to said piston, said piston rod extending into said first working chamber, a free end of said piston facing said second working chamber.

22. The piston sensor system according to claim 12 wherein
said piston displacement sensor comprises a rod-shaped body; and
said piston comprise a magnetic ring.

* * * * *